Jan. 9, 1923.

W. T. CAMPBELL.
SPARE TIRE LOCK.
FILED JULY 1, 1921.

1,441,328

INVENTOR
Walter T. Campbell
BY
ATTORNEYS

Patented Jan. 9, 1923.

1,441,328

UNITED STATES PATENT OFFICE.

WALTER T. CAMPBELL, OF ST. LOUIS, MISSOURI.

SPARE-TIRE LOCK.

Application filed July 1, 1921. Serial No. 481,870.

*To all whom it may concern:*

Be it known that I, WALTER T. CAMPBELL, a citizen of the United States, residing at St. Louis, Missouri, have invented a certain new and useful Improvement in Spare-Tire Locks, of which the following is a full, clear, and exact description, such as will enable others skilled in the art to which it appertains to make and use the same.

This invention relates to spare tire locks for vehicles of the kind that consists of a band which is adapted to be passed around a spare tire and the carrier on the vehicle on which the tire is mounted, and a locking element for securing the ends of said band together in such a manner that an unauthorized person cannot remove the band from the tire and tire carrier which it surrounds.

One object of my invention is to provide a spare tire lock of the general type referred to that is equipped with a novel means for preventing the band from cutting or chafing the tire and for preventing the lock as an entirety from rattling against the tire carrier.

Another object is to provide a spare tire lock in which the element that secures the ends of the band together also serves to hold the band in snug engagement with the tire and out of contact with the tire carrier. Other objects and desirable features of my invention will be hereinafter pointed out.

To this end I have devised a spare tire lock that consists of a band which is adapted to be passed around a spare tire and the carrier on the vehicle on which the tire is mounted, an adjustable element arranged in such a manner that when it is moved in one direction it will secure the ends of the band together and also draw the band into snug engagement with the tire and hold said band spaced away from the tire carrier, and a concealed key-controlled device for locking said adjustable element. The band of the lock can be constructed in various ways without departing from the spirit of my invention, but it is preferably of such design that one end portion of same laps over the other end portion and the adjustable element previously referred to is mounted in one end portion of the band and is adapted to be forced through an opening in the other end portion of the band and into engagement with the tire carrier. The key-controlled device that is used for locking said adjustable element can also be formed in various ways, so long as it is of such construction and arrangement that it cannot be actuated or tampered with by an unauthorized person.

Figure 1 of the drawings is a top plan view of a spare tire lock constructed in accordance with my present invention.

Figure 2:
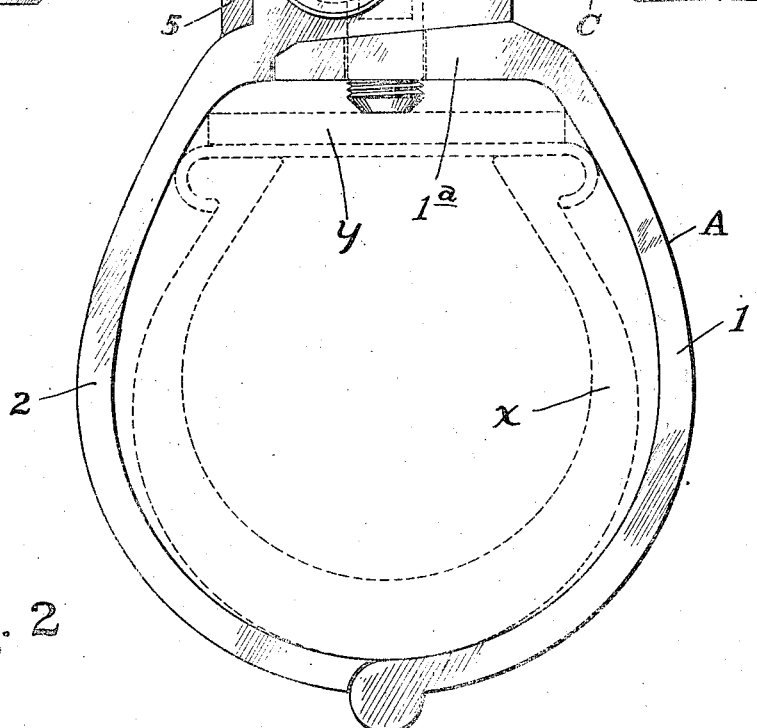
Figure 2 is a side elevational view of said lock.

Referring to the drawings which illustrate the preferred form of my invention, A designates the band of the lock which is adapted to be passed around a spare tire $x$ and the carrier $y$ on the vehicle on which said tire is mounted. Said band can either consist of a flexible, indestructible member, or it can consist of a plurality of rigid, segmental sections 1 and 2 connected together by a concealed hinge and of such shape that they conform approximately to the cross-sectional shape of the tire, as shown in Figure 2, the section 1 being provided at its free end with an angularly-disposed portion $1^a$ that laps over and extends transversely of the tire carrier, and the section 2 being provided at its free end with an angularly-disposed portion $2^a$ that laps over the angularly-disposed portion $1^a$ on the section 1 of the band. An adjustable element B is mounted in the free end portion of the section 2 of the band in such a manner that it can be forced through a hole in the angularly-disposed portion $1^a$ of the section 1 and then into engagement with the tire carrier $y$, so as to lock the free ends of the band together and also draw said band into snug engagement with the tire and hold said band practically stationary with relation to the tire carrier, thereby preventing the band from cutting or chafing the tire or from rattling against the metallic tire carrier. In the form of my invention herein illustrated the element B consists of a screw arranged vertically in an internally screw-threaded hole in the end portion $2^a$ of the section 2 and of such length that it can be moved downwardly through an aligned hole in the portion $1^a$ of the section 1 and into engagement with the tire carrier $y$, said screw being provided at its upper end with a screw driver slot 3 or a non-circularshaped portion to which a wrench can be applied.

Figure 1:
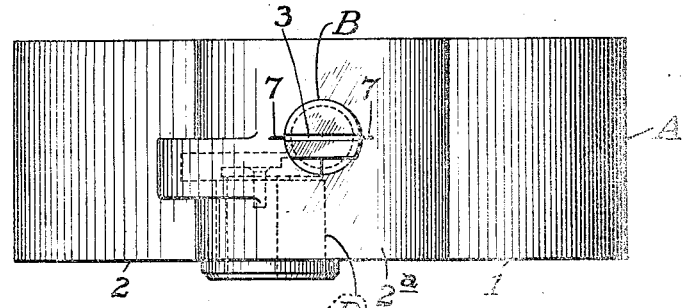
Figure 3:
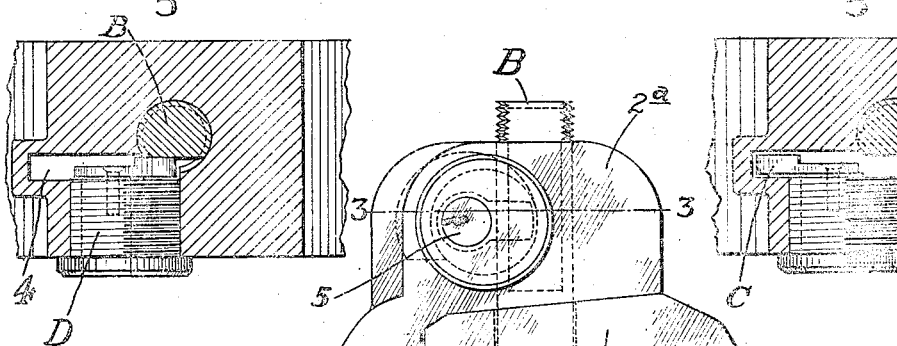
Figure 3 is a cross-sectional view, taken on the line 3—3 of Figure 2.
Figure 4:
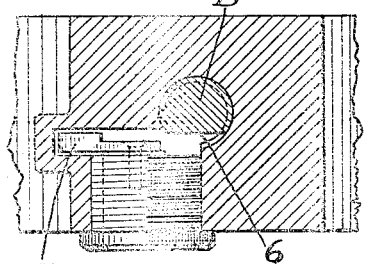
Figure 4 is a sectional view similar to Figure 3, with the key-controlled locking device arranged in its inoperative position.

A concealed key-controlled locking device C is provided for locking the element B in operative position, and while the particular construction and arrangement of said locking device C is immaterial so far as my broad idea is concerned, I prefer to use a locking device C that consists of a shiftable part arranged in a concealed pocket 4 in the end portion 2ª of the section 2 and combined with a barrel lock D in said portion 2ª in such a manner that when the key of the lock is inserted in the barrel 5 of the lock and turned in one direction, the device C will be moved into locking engagement with the element B, as shown in Figure 3, and when said key is turned in the opposite direction, said locking device will be moved out of engagement with the element B and into an inoperative position, as shown in Figure 4. The locking device C can be formed conveniently by an arm connected to the inner end of the barrel 5 of the lock and so arranged with relation to the element B that when said arm is swung into its operative position, as shown in Figure 3, it will engage a flat surface 6 on the element B, and thus prevent said element from being turned in either direction. Accordingly, after the element B has been forced through the portion 1ª of the section 1 and moved into engagement with the tire carrier y and the locking device C has been moved into locking engagement with said element, it will be impossible for an unauthorized person to remove the band from the tire and the tire carrier which said band surrounds. Moreover, as the locking device C prevents the element B from working loose, the band of the lock will be held so snugly against the tire that it cannot move relatively to the tire, and thus cut or chafe the tire, and it cannot rattle against the tire carrier. In order to assist the user in setting the element B in such a position that the flat surface 6 thereon will be arranged parallel with the locking device C, the portion 2ª in which said element B is mounted is preferably provided with marks 7, as shown in Figure 1, that align with the screw driver slot 3 in the end of said element when the flat surface 6 on said element is disposed in parallel relation with the locking device C.

A spare tire lock of the construction above described is inexpensive to manufacture; it can be applied and removed easily; it locks the tire securely to the carrier and it will not cut or chafe the tire or rattle against the tire carrier.

Having thus described my invention, what I claim as new and desire to secure by Letters Patent is:

1. A spare tire lock, comprising a band that is adapted to surround a spare tire and the carrier on which the tire is mounted, and an adjustable element for locking said band in operative position and for moving said band relatively to the tire so as to hold it in sufficiently snug engagement with the tire to prevent cutting or chafing of the tire or rattling against the tire carrier.

2. A spare tire lock, comprising a band that is adapted to be passed around a tire and the carrier on which the tire is mounted, and an adjustable element for securing the free ends of said band together and adapted to be moved into engagement with the tire carrier so as to move the band relatively to the tire carrier and thus draw the band into snug engagement with the tire which it surrounds.

3. A spare tire lock, comprising a band that is adapted to surround a spare tire and the carrier on which the tire is mounted, an adjustable element for locking said band in operative position for drawing said band into snug engagement with the tire, and a concealed key-controlled device for preventing an unauthorized person from manipulating said element.

4. A spare tire lock, comprising a band adapted to be placed around a tire and a tire carrier with its end portions overlapped, an adjustable element mounted in one end portion of the band and adapted to be forced through a hole in the other end portion of the band and moved into engagement with the tire carrier so as to secure the end portions of the band together and hold the band in snug engagement with the tire, and means for locking said adjustable element.

5. A spare tire lock, comprising a band adapted to be placed around a tire and a tire carrier with its end portions overlapped, an adjustable element mounted in one end portion of the band and adapted to be forced through a hole in the other end portion of the band and moved into engagement with the tire carrier so as to secure the end portions of the band together and hold the band in snug engagement with the tire, and a concealed key-controlled device for locking said adjustable element.

6. A spare tire lock, comprising a band adapted to be placed around a tire and a carrier on which the tire is mounted and provided with overlapping end portions, an adjustable element arranged in one portion of the band at substantially right angles to same and adapted to be moved into locking engagement with the other end portion of the band, and a concealed key-controlled device for locking said adjustable element.

7. A spare tire lock, comprising a band composed of pivotally connected sections of such shape that they will surround a tire and the carrier on which the tire is mounted, the free end portion of one section lapping over the end portion of the other section, an adjustable element arranged in the end portion of one section at substantially right angles to same and adapted to be moved into locking engagement with the end portion of the other section, a barrel lock in the section that carries said adjustable element, and a locking device secured to the barrel of said lock and adapted to be moved into position to engage and lock said adjustable element.

8. A spare tire lock composed of two segmental-shaped sections pivotally connected together and provided at their free ends with angularly-disposed portions, one of which laps over the other, a screw adjustably mounted in the outer portion and adapted to be forced through a hole in the inner portion and moved into engagement with the tire carrier, so as to prevent the device as an entirety from cutting or chafing the tire or rattling against the tire carrier, a concealed chamber in said outer portion, and a key-controlled lock in said chamber adapted to be moved into engagement with said screw to lock same.

WALTER T. CAMPBELL.